United States Patent [19]

Warren et al.

[11] Patent Number: 4,892,756

[45] Date of Patent: Jan. 9, 1990

[54] FLOCK ADHESIVE COMPOSITION

[75] Inventors: Patrick A. Warren, Erie; Robert A. Auerbach, Williamsport; Eugene L. Polaski, Erie, all of Pa.

[73] Assignee: Lord Corporation, Erie, Pa.

[21] Appl. No.: 326,215

[22] Filed: Mar. 20, 1989

Related U.S. Application Data

[62] Division of Ser. No. 203,795, Jun. 6, 1988, Pat. No. 4,835,226.

[51] Int. Cl.$^4$ ............................................. C08G 18/58
[52] U.S. Cl. ..................................... 427/206; 528/45; 528/61
[58] Field of Search .......................................... 427/206

[56] References Cited

U.S. PATENT DOCUMENTS

| | | | |
|---|---|---|---|
| 2,905,582 | 9/1959 | Coleman, Jr. et al. | 154/139 |
| 3,501,329 | 3/1970 | Kent | 525/460 X |
| 3,510,439 | 5/1970 | Kaltenbach et al. | 260/18 |
| 3,542,639 | 11/1970 | Manino | 161/186 |
| 3,878,134 | 4/1975 | Ozelli | 260/4 R |
| 3,912,566 | 10/1975 | Andrews et al. | 156/330 |
| 4,533,715 | 8/1985 | Lee et al. | 528/73 X |
| 4,535,121 | 8/1985 | Ozelli et al. | 528/73 X |
| 4,569,961 | 2/1986 | Ozelli | 524/186 |
| 4,587,149 | 5/1986 | Murachi | 428/90 |

*Primary Examiner*—Earl Nielsen
*Attorney, Agent, or Firm*—Larson and Taylor

[57] ABSTRACT

A flock adhesive composition comprising
A. about 1 to 20% by weight of an aromatic nitroso compound;
B. about 1 to 20% by weight of an epoxy resin having an epoxy equivalent of at least one; and
C. about 60 to 98% by weight of a blocked isocyanate-functional urethane prepolymer, the isocyanate group or groups of said prepolymer being blocked with a blocking agent comprising a substituted or unsubstituted phenol.

5 Claims, No Drawings

FLOCK ADHESIVE COMPOSITION

This is a division of Ser. No. 203,795, filed June 6, 1988, now U.S. Pat. No. 4,835,226, issued May 30, 1989.

FIELD OF THE INVENTION

The invention relates to flock adhesive compositions. More particularly, the invention is directed to flock adhesive compositions of improved mixture and heat stability also possessing superior adhesive strength.

BACKGROUND OF THE INVENTION

The preparation of flocked rubber articles wherein flocks are fixed to the surface of the rubber material through an adhesive layer such as a polyurethane are well known. In such processes, the rubber surface is coated with a layer of the adhesive and short staple fibers are applied perpendicularly thereof utilizing an electrical field. The resulting electrostatically flocked articles are characterized by a fabric-like surface of relatively low friction. This feature renders flocked rubber articles particularly suitable for the purpose of reducing friction between the sliding glass window and window channel of automobiles. In view of the mechanical stresses involved in this application, it is imperative that the adhesive used to bond the flock to the rubber should contain components which not only bond to the flock but also to the rubber substrate. To this end, prior art flock adhesives comprised of isocyanate-functional urethane prepolymers have been improved by the inclusion therein of minor amounts of epoxy resins and aromatic nitroso compounds. Unfortunately, these adhesive compositions are unstable and moisture sensitive and exhibit a reduced open time. Consequently, they often lead to a gumming-up of adhesive application equipment. Attempts have been made to alleviate the moisture sensitivity and instability properties that plague isocyanate adhesives by blocking the isocyanate functionalities with blocking agents. While these attempts have been successful in many instances, it has always been at the expense of adhesive strength.

It is an object of the present invention, therefore, to improve flock adhesive compositions with respect to moisture and heat stability without adversely affecting adhesive strength.

Another object of the present invention is to prepare flocked rubber articles using a flock adhesive composition containing a blocked urethane prepolymer improved with respect to moisture and heat stability while simultaneously improving its adhesive strength.

Yet another object of the present invention is to provide a blocked urethane prepolymer of improved open time.

A further object of the invention is to provide a urethane adhesive composition reduced in free isocyanate content thereby minimizing the adverse environmental effects that characterize isocyanate adhesives.

SUMMARY OF THE INVENTION

These and other objects of the invention are obtained by a flock adhesive composition comprised of A. about 1 to 20%, preferably 10 to 15% by weight of an aromatic nitroso compound;

B. about 1 to 20%, preferably 10 to 15% by weight of an epoxy resin having an average number of epoxy groups per molecule of greater than 1; and C. about 60 to 98%, preferably 70 to 80% by weight of a blocked isocyanate-functional urethane prepolymer, the isocyanate group or groups of said prepolymers being blocked with a blocking agent comprising a substituted or unsubstituted phenol.

It was surprising to find that an isocyanate prepolymer that has been blocked with a phenol as blocking agent, together with an aromatic nitroso compound and epoxy resin in the claimed system provides an adhesive composition that not only possesses improved moisture and heat stability but also improved adhesive strength. As aforementioned, the improvements in adhesive strength exhibited by the composition of the invention is unexpected since adhesive compositions containing block isocyanate-functional urethanes are not known to possess adhesive strengths superior to their unblocked counterparts. Moreover, it has been found that this improvement in adhesive strength is only achieved in the claimed adhesive system when the blocking agent selected is an unsubstituted or substituted phenol and is not experienced when other conventional isocyanate blocking agents such as methyl ethyl ketoxime are employed.

DESCRIPTION OF THE INVENTION

The epoxy resins which are suitable for use in the practice of the invention can be any polymeric resin having an epoxy equivalency greater than one, that is, wherein the average number of epoxy groups per molecule is greater than one. Epoxy resins are well known. See, for example, U.S. Pat. Nos. 2,467,171; 2,615,007; 2,716,123; 3,030,336; and 3,053,855, hereby incorporated by reference. Useful epoxy resins include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as bis-phenol A, 1,1-bis(4-hydroxyphenyl) ethane, 1,1-bis(4-hydroxyphenyl) isobutane, and 1,5-dihydroxynaphthalene. Especially suitable epoxide resins are polyglycidyl ethers of 2,2,-bis(4-hydroxyphenyl) propane or of a novolak from substituted (e.g., with alkyl or halogen groups) or unsubstituted phenol and formaldehyde having an epoxide content of at least 1.0 epoxide equivalent per kilogram.

The aromatic nitroso compounds which are suitable for use in the practice of the present invention can be any aromatic hydrocarbon, such as benzenes, naphthalene, anthracenes, biphenyls and the like, containing at least one nitroso group attached directly to a ring carbon atom. Where two or more nitroso groups are present, as is preferred, they are attached to non-adjacent ring carbon atoms. More particularly, such nitroso compounds are as described as poly-C-nitroso aromatic compounds having from 1 to 3 aromatic nuclei, including fused aromatic nuclei, having from 2 to 6 nitroso groups attached directly to non-adjacent nuclear carbon atoms. The presently preferred poly-C-nitroso materials are the di-nitroso aromatic compounds, especially the dinitrosobenzenes and dinitrosonaphthalenes, such as the meta- or paradinitrosobenzenes and the meta- or paradinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and the like groups. The presence of such substituents on the aromatic nucleus has little effect on the activity of the poly-C-nitroso compounds in the present invention. As far as is presently known, there is no limitation as to the character of the substituent, and such substituents can be organic or inorganic in nature. Thus, where reference is made herein to poly-C-nitroso or di-C-nitroso "aromatic compound", "benzenes", or "naphthalenes", it will be understood to include both substituted and unsubstituted nitroso compounds, unless otherwise specified.

Particularly preferred poly-C-nitroso compounds are characterized by the formula:

wherein
Ar is selected from the group consisting of phenylene and naphthalene;
$R^9$ is a monovalent organic radical selected from the group consisting of alkyl, cycloalkyl, aryl, aralkyl, alkaryl, arylamine and alkoxy radicals having from 1 to 20 carbon atoms, amino or halogen, and is preferably an alkyl group having from 1 to 8 carbon atoms; and
p is zero, 1, 2, 3 or 4 and is preferably zero.

A partial non-limiting listing of suitable poly-C-nitroso compounds which are suitable for use in the practice of the invention include m-dinitrosobenzene, p-dinitrosobenzene, m-dinitrosonapnthalene, p-dinitrosonaphthalene, 2,5-dinitroso-p-cymene, 2-methyl-1,4-dinitrosobenzene, 2-methyl-5-chloro-1,4-dinitrisobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, and 2-cyclohexyl-1,4-dinitrosobenzene.

The isocyanate-functional urethanes which can be employed in forming blocked urethanes suitable for use in preparing the adhesive compositions of the present invention comprise the reaction product between one or more organic compounds having at least two active hydrogen atoms and a stoichiometric excess of at least one polyisocyanate. Generally, such isocyanate-functional urethanes will be prepared by reacting a polyol, polyether, hydroxyl-terminated polyester, polyester amide, polyamide, or other polyfunctional active hydrogen compound with a diisocyanate or other polyisocyanate having up to eight functional isocyanate groups. Examples of such reactants include polyhydroxy polyesters, polyhydroxy polyethers and polyisocyanates having two to three reactive isocyanate groups. An extensive description of some of the useful techniques for preparing isocyanate-functional urethnanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, any isocyanate-functional urethane known in the art can be employed in the practice of this invention, with such urethanes having a molecular weight of at least 500, particularly in the range of 1,000 to 10,000, being preferred.

Preferred reactants for reaction with the polyisocyanates to prepare the isocyanate-functional urethanes of the invention are poly(alkylene oxide) polyols having at least two hydroxyl groups. The polyols are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 100 to about 4000, preferably about 100 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols dervied from cyclic ethers such as dioxolane, which affords a polyol having the formula $HO(C-H_2OCH_2CH_2O)_nH$, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(etnylene oxide) polyols, poly(propylene oxide) polyols, poly(tetramethylene oxide) polyols, poly(nonamethylene oxide) polyols, poly(oxymethylene-ethylene)oxide) polyols, poly(ethylene oxide-propylene oxide copolymer) polyols, and poly(pentaerythritol-ethylene oxide) polyols. Thus, the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols.

If desired, substantially any of the known monomeric alcohols having at least two hydroxyl groups, and polymeric non-poly(alkylene oxide) polyols having at least two hydroxyl groups can be employed as optional ingredient in combination with poly(alkylene oxide) polyols to form the isocyanate-functional urethanes of the invention. Representative monomeric and polymeric polyols and polyesters which can optionally provide up to about 97 mol percent of hydroxyl functionality include 1,4-butanediol; 1,3-butylene glycol; 1,6-hexane diol; cyclohexane diol; 4,4'-metnylenebis-(cyclohexanol); glycerol; trimethylolpropane; 1,2,6-hyexanetriol; erythritol; pentaerythritol; neopentyl glycol; polycaprolactone diols and triols, poly(butadiene) diols; hydroxylated poly(butadiene) dienes; poly(tetramethylene adipate) diol; polyethylene succinate) diol; poly(1,3-butylene sebacate) diol; and (1,3-butylene glycol/glycerine/adipic acid/isophthalic acid) diol and triols. Mixtures of such monomeric and polymeric compounds can be employed.

When employed the monomeric or polymeric (non-poly alkylene oxide) polyols will normally be present in an amount ranging from 5 to 40% by weight, preferably 5 to 35% by weight of the poly(alkylene oxide) polyol ingredient.

Any of the polyisocyanates having at least two reactive isocyanate groups can be employed in forming the isocyanate-functional urethanes of the invention. Such polyisocyanates include, without limitation, aliphatic polyisocyanates such as 1,6-hexamethylene diisocyanate; 1,8-octamethylene diisocyanate, 1,12-dodecamethylene diisocyanate; 2,2,4-trimethylhexamethylene diisocyanate; and the like; 3,3'diisocyanatodipropyl ether; 3-isocyanateomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis(cyclohexyl-isocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates; as well as other known polyisocyanates derived from aliphatic polyamines, aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'bipnenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

Particularly preferred are isocyanate-functional urethanes prepared by reacting a mixture of trimethyl propane and poly(propylene oxide) polyols with 4,4,-diphenyl methane diisocyanate. These isocyanate-functional urethanes have the structure:

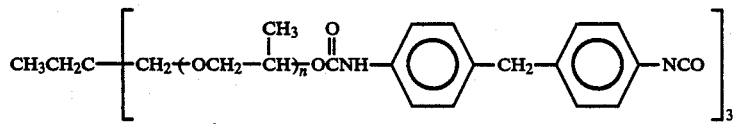

n=approximately 24–28.

In forming the blocked urethanes, he isocyanate-functional urethanes are blocked employing conventional techniques using as the blocking agent an unsubstituted or substituted phenol. Such blocking agents, include for example, phenol and alkyl-substituted phenols, such as phenols substituted with alkyl groups of 1 to 10 carbon atoms or more. Preferred alkyl-substituted phenols are p-, m- and o- cresol, octylphenol and nonylphenol. It is preferred to employ the blocking agent in a ratio of equivalents by weight of active isocyanate functions to blocking agent in a range from about 1:1 to about 1:4. Of course, mixtures of the different blocking agents, as well as two or more different isocyanate-functional urethanes, can be used.

The adhesives of the invention can be applied to, or coated onto cured or uncured elastomers. In many cases, however, it is desirable to use preparations of lower viscosity. Thus, the adhesive composition of the invention can be dissolved in organic solvents such as, for example, xylene, toluene, methylisobutyl ketone, and/or ethylene chloride. A total solids or non-volatile content of about 40 to 100% by weight is usually employed depending on the desired viscosity.

The adhesives of the invention can be used in the form of one-component preparations and hardened by heating to a temperature of 300° F. to 500° F. so as to effect the desired hardening. If desired, any of the conventional hardening agents such as polyhydric alcohol or a poly-functional amine can be utilized to assist the hardening process.

In addition, the adhesive compositions of the invention can contain conventional auxiliary methods such as filler materials such as carbon black and the like, pigments, viscosity improvers such as fumed silica, etc. Also, catalysts to facilitate curing can be incorporated. The preferred catalysts are DABCO (triethylenediamine) and Quadrol (N,N,N',N'-tetrakis(2-hydroxypropyl)ethylenediamine) and mixtures thereof.

In the flocking of uncured elastomers, mixtures normally used in the vulcanization process such as, for example, fatty acids, oxides of magnesium, calcium or zinc, the vulcanization accelerators, stabilizers, solvents, fillers and the like are shaped into the desired form and coated with the adhesive of the invention. The flock fibers are then applied in electrostatic field and the flocked elastomer is vulcanized for about 2 to 60 minutes at temperatures in the range of about 300° F. to 500° F. during which the adhesive is hardened.

In the coating of cured elastomers, the flock adhesive of the invention is applied or coated onto rubber in a conventional manner such as by dipping, spraying, brushing, and the like. After the coating, the fibers are applied in electrostatic field and the adhesive subsequently hardened for about 1 to 4 minutes at temperatures in the range of 300° to 500° F.

Various elastomers can be flocked before or after vulcanization using the adhesives of the invention. Illustrative of elastomeric materials that can be flocked are natural rubbers, polycnloroprene rubber, nitrile rubber, chlorobutadiene, chlorinated isoprenes, butyl rubber, polyurethane rubber or elastomers based on styrene-butadiene or styrene-isoprene. In most instances, however, the adhesives will be used to flock elastomers based on ethylene/propylene copolymers (EPM) and terpolymers of ethylene, propylene and diene monomers such as, for example, diethylidene norbornene. Elastomers of this type are commercially available and are known collectively as EPDM elastomers.

The fibers applied using the adhesives of the invention include various synthetic fibers, for example, can be polyester fibers such as polyethylene terephthalate, polyamide fibers such as Nylon-6 or Nylon-6,6, polyurethane fibers, cotton fibers and/or cellulose fibers. Staple fibers having an average length of about 0.2 mm to about 2 mm are preferably used.

In most instances, the adhesives of the invention will be used to flock profiles of rubber elastomers which are employed for the lining of automobile window compartments. Other applications include the production of flocked mats, flocked flexible shafts, flocked floor coverings, flocked rubber gloves, and the like.

The following examples are provided for purposes of illustrating the invention, it being understood that the invention is not limited to the examples nor to the specific details therein enumerated.

EXAMPLE I

An isocyanate-functional urethane prepolymer having the structure:

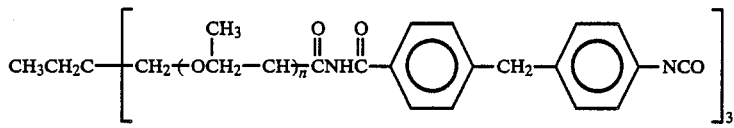

was blocked by the following procedure:

To 82.7% by weight of the prepolymer was added 16.1% by weight nonylphenol and 0.01% by weight dibutyl tin dilaurate catalyst and the resulting mixture allowed to react at 80° C. under nitrogen purge until the NCO content was less than 0.1% by weight.

EXAMPLE II

A flock adhesive was prepared as follows:

To 74.8% by weight (dry) of the nonylphenol-block urethane prepolymer having the structure:

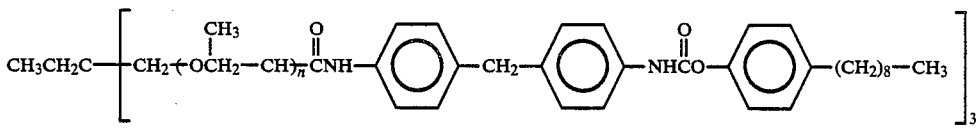

prepared by Example I was added 12.1% by weight (dry) dinitrosobenzene and xylene to a solids content of 52% by weight. This mixture was ground in a Kady Mill at slow speed until a grind of 1 mil was reached. The resulting mixture was packaged off and 13.1% by weight (dry) of an epoxy novolak resin having an epoxy equivalent of 176–181 was added thereto and thoroughly mixed. The resulting adhesive was designated Flock Adhesive A.

EXAMPLE III

The surface of semi-cured and fully-cured tensile pads of EPDM rubber was wiped with perchloroethylene to remove any contamination that may have been on the surface. While the pads were still warm (approximately 200° F.) they were given one brush coat of Flock Adhesive A of Example II. The coated pads were placed coated side down in a high-voltage flock chamber and flocked with polyester flock using a flocking cycle of 15 seconds and a voltage of 60.0 kilovolts. After flocking the pads were lightly brushed to remove any excess flock.

The flocked, semi-cured and fully-cured EPDM pads were then put into an oven and cured either at 350° F. for 3 minutes or 400° F. for 3 minutes. The resulting flocked parts were removed from the oven and allowed to cool at ambient temperatures overnight.

The following morning, the flocked pads were once again brushed to remove excess flock. Test strips 5 inches long by 0.5 inches wide were cut from the pads and subjected to the epoxy bond test and to the double rub test described below:

Epoxy Bond Test

This test was designed to test the adhesion of the adhesive to the EPDM substrate. The flocked test strips were bonded to degreased blasted steel coupons using a two-part epoxy adhesive. The epoxy adhesive was applied to the coupons which were taped off to expose a one square inch area. After application of the epoxy adhesive, the flocked test strip was pressed into the epoxy adhesive with the flocked side down. A blank coupon was then placed on the back of the test strip, and the whole assembly held in place with binder clips. The assemblies were put into an oven and the adhesive was cured 20 minutes at 250° F. After cure, the clips were removed and the bonded strips were left to sit at ambient conditions until they cooled. The strips were then peeled from the coupons at a 45° degree angle and a speed of 2 inches per minute. The tests were conducted at ambient conditions. The peel strength in pounds per lineal inch (pli) and the percent rubber retention of the coupons were recorded.

Double Rub Test

This test was designed to measure the adhesion of the adhesive to the flock. Test strips as prepared above were rubbed with a tongue depressor at a 45° angle until the flock wore away and the surface of the EPDM was exposed. The number of double rubs needed to achieve this was recorded. Three samples were used per test.

The results of the Epoxy Bond Test and the Double Rub Test are reported in the table below:

| Test Strip | pli | % Rubber Retention | Number of Double Rubs |
|---|---|---|---|
| I. Semi-cured EPDM Flock Adhesive cured at 350° F. for 3 minutes | 45.7 | 77 | 53 |
| II. Semi-cured EPDM Flock Adhesive cured at 400° F. for 3 minutes | 45.6 | 76 | 65 |
| III. Fully-cured EPDM Flock Adhesive cured at 350° F. for 3 minutes | 38.3 | 44 | 17 |
| IV. Fully-cured EPDM Flock Adhesive cured at 400° F. for 3 minutes | 45.8 | 62 | 43 |

The data demonstrates that the adhesive composition of the invention possesses excellent adhesion to both flock and EPDM rubber.

EXAMPLE IV

The open time of a commercial flock adhesive designated Flock Adhesive L having the formulation:

| Flock Adhesive L* | % By Weight (Dry) |
|---|---|
| Unblocked prepolymer identified in Example I | 92.1 |
| p-Ditrosobenzene | 2.3 |
| Epoxy novolak resin | 1.9 |
| Trimethylorthoformate | 0.96 |
| Fumed silica | 0.8 |
| Tosyl isocyanate | 1.9 |

*At a solids content of 52% by weight in a xylene/methyisobutyl ketone/BC 300/propylene carbonate solvent system and Flock Adhesive A were compared by the following test:

Samples of both adhesives were poured into pans and the appearance of the adhesives was checked at regular intervals. Both adhesives appeared similar up to five hours open time. By eighteen hours open time, commercial Flock Adhesive L had crosslinked whereas Flock Adhesive A was still a liquid, thereby demonstrating that Flock Adhesive A has a better open time than commercial Flock Adhesive L.

EXAMPLE V

A Flock Adhesive C was prepared as in Example II but in the following proportions:

|  | % By Weight (Dry) |
|---|---|
| Blocked prepolymer | 95.6 |
| p-Dinitrosobenzene | 2.4 |
| Epoxy novolak resin | 2.0 |

A Flock Adhesive D was prepared in the same proportions as Flock Adhesive C but substituting the unblocked prepolymer identified in Example I for the blocked prepolymer.

Four test strips were prepared according to the procedure described in Example III but using Flock Adhesive C and four test strips were similarly prepared using Flock Adhesive D. The test strips were subjected to the Epoxy Bond Test. The results are reported in the following table.

| Test Strip | Adhesive | pli | % Rubber Retention |
|---|---|---|---|
| I | C | 32.7 | 31 |
|  | D | 27.4 | 20 |
| II | C | 51.7 | 91 |
|  | D | 30.3 | 41 |
| III | C | 46.8 | 58 |
|  | D | 31.0 | 34 |
| IV | C | 53.3 | 86 |
|  | D | 34.9 | 30 |

The results demonstrated that in each instance the adhesive composition of the invention (Flock Adhesive C) containing the blocked prepolymers provided a significantly higher adhesive strength (pli) and greater percent rubber retention than did the identical adhesive composition but containing the prepolymer in an unblocked state (Flock Adhesive D).

It is claimed:

1. In the preparation of flocked rubber articles wherein flocks of staple fibers are fixed to the surface of a rubber substrate through an adhesive layer, the improvement comprising employing as the adhesive layer the adhesive composition comprising:
   A. about 1 to 20% by weight of an aromatic nitroso compound;
   B. about 1 to 20% by weight of an epoxy resin having an epoxy equivalent of at least one; and
   C. about 60 to 98% by weight of a blocked isocyanate-functional urethane prepolymer, the isocyanate group or groups of said prepolymer being blocked with a blocking agent comprising a substituted or unsubstituted phenol.

2. An improvement according to claim 1 wherein the aromatic nitroso compound is dinitrosobenzene.

3. An improvement according to claim 1 wherein the epoxy resin is an epoxy novolak resin.

4. An improvement according to claim 1 wherein the alkylphenol is nonylphenol.

5. An improvement according to claim 1 wherein the blocked isocyanate-functional urethane prepolymer has the structure:

$$CH_3CH_2C\left[CH_2\left(OCH_2-\underset{CH_3}{\underset{|}{CH}}\right)_{\overline{n}}O\overset{O}{\overset{\|}{C}}NH-\underset{}{\bigcirc}-CH_2-\underset{}{\bigcirc}-NCO\right]_3$$

* * * * *